Figure 1:
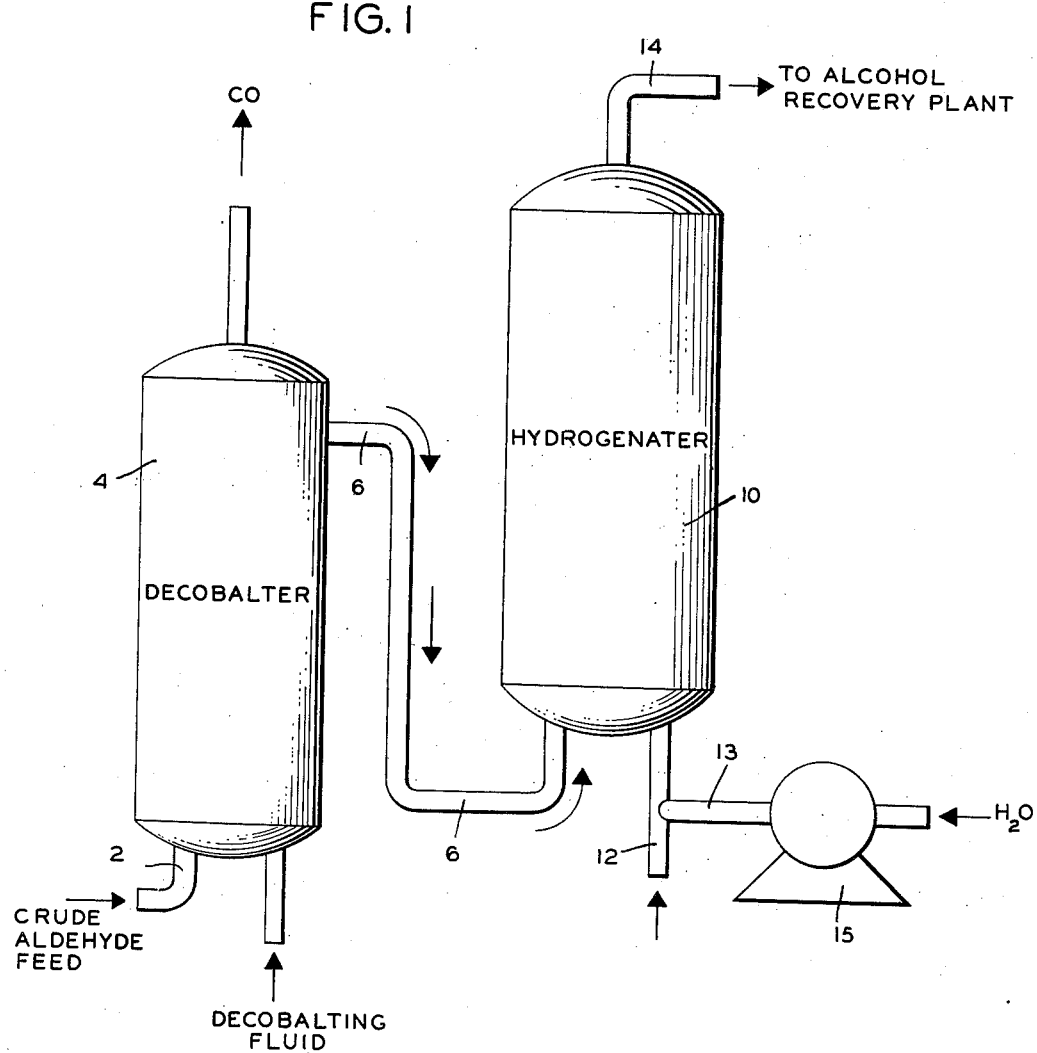

Oct. 8, 1957 J. K. MERTZWEILER ET AL 2,809,220
HYDROGENATION OF OXO ALDEHYDES IN THE PRESENCE
OF SULFACTIVE CATALYSTS AND WATER
Filed May 11, 1954

INVENTORS
JOSEPH K. MERTZWEILER
RALPH B. MASON
BY
ATTORNEY 2,809,220

HYDROGENATION OF OXO ALDEHYDES IN THE PRESENCE OF SULFACTIVE CATALYSTS AND WATER

Joseph K. Mertzweiller and Ralph B. Mason, Baton Rouge, La., assignors to Esso Research and Engineering Company, a corporation of Delaware Application May 11, 1954, Serial No. 428,861

4 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for increasing the selectivity of the process to useful alcohols. The present invention is a continuation-in-part of Serial No. 122,612, filed October 21, 1949, and now abandoned.

It is now well known in the art that oxygenated organic compounds may be synthesized from olefinic organic compounds by reaction of the latter with carbon monoxide and hydrogen in the presence of a catalyst containing cobalt or iron or other carbonylation catalyst in an essentially three-stage process. In the first stage the olefinic material, catalyst and synthesis gases are reacted under pressure to give a product consisting predominantly of aldehydes containing one more carbon atom than the olefinic material, as well as a certain amount of secondary reaction products, polymeric material, etc. This oxygenated organic mixture, which contains in solution compounds of the metal catalyst, may be thermally treated in a second stage to cause decomposition and removal of the soluble catalytic material from the organic mixture. The catalyst-free material may then be hydrogenated in a hydrogenation stage to the corresponding alcohol, or it may be oxidized to the corresponding carboxylic acid.

This carbonylation reaction provides a particularly attractive method for the preparation of valuable primary alcohols, which find large outlets, particularly as intermediates for plasticizers, detergents, and solvents. Not only long and short chained olefin hydrocarbons, but also most other types of organic compounds containing at least one olefinic double linkage, such as unsaturated acids, esters, alcohols, ketones, etc. are susceptible to this type of reaction.

The catalyst for the first stage of the reaction, where olefinic material is converted into aldehydes, is usually added in the form of salts of the catalytically active metal with high molecular weight organic acids, such as oleic, stearic, naphthenic, etc. Examples of such catalyst salts or soaps are cobalt oleate, stearate, naphthenate and the like. These salts are soluble in the liquid olefin or olefin-paraffin feed, and may be supplied to the first stage as dissolved in the feed or as hydrocarbon solution. Other forms of cobalt, such as the low molecular weight organic salts, as the acetate or formate, cobalt oxide, carbonate, or the metal itself may be employed.

As the synthesis gases are consumed at equivalent or equimolar rates, synthesis gas components are usually added at equimolar proportions of $H_2$ and CO, though it has been suggested to use both an excess of hydrogen and an excess of CO. The conditions for reacting olefinic compounds with hydrogen and carbon monoxide vary somewhat in accordance with the nature of the olefinic feed, but the reaction is generally conducted at pressures of about 3000 pounds per square inch and at temperatures in the range of about 250°–400° F. The ratio of synthesis gas feed to olefin may vary widely; in general, about 1000 to 15,000 cubic feet of $H_2+CO$ per barrel of olefin feed are employed.

At the end of the first stage, when the desired conversion of olefins to oxygenated compounds has been effected, the products and the unreacted material are generally withdrawn to a catalyst removal zone, where dissolved catalyst is removed from the mixture. This may be accomplished by reacting the catalyst-contaminated crude first stage product with an inert gas or vapor, or with water or dilute acid at moderate temperatures.

The crude product freed from catalyst contaminants, such as cobalt carbonyls and compounds or complexes, is thereafter hydrogenated in a hydrogenation zone, and it is to this stage that the present principal invention relates.

Though the first stage in the carbonylation is generally designated the aldehyde-forming reaction, i. e., a mol of CO and of $H_2$ react in the presence of a cobalt catalyst and an olefin to form a mol of corresponding aldehyde, the selectivity to aldehyde is closer to 50%. Along with the formation of aldehyde there occurs also, because of the high hydrogen partial pressure in the carbonylation stage, a substantial hydrogenation of the aldehyde product to alcohols. The latter react further with aldehydes to form acetals. Furthermore, reactions of the Cannizzaro type occur, forming esters, and the aldol reaction also takes place. Thus, the product designated "aldehyde" is really a complex mixture of crude aldehyde and a high percentage of secondary reaction products. It is this material that is subjected to the subsequent hydrogenation reaction.

It has further been found that the hydrogenation reaction is generally accompanied, to a certain extent, by the formation of additional secondary reaction products. In particular it has been found that when the crude aldehyde product is hydrogenated, there is produced a substantial amount of olefin corresponding in number of carbon atoms to the aldehyde being hydrogenated and resulting in all probability, from dehydration of the alcohol initially formed.

The formation of these undesired by-products is particularly noted when sulfactive hydrogenation catalysts, such as the sulfides of tungsten, molybdenum, nickel and the like, supported or unsupported, are employed. This type of catalyst requires higher temperature than the more conventional and active, but sulfur and carbon monoxide-sensitive hydrogenation catalysts such as nickel or copper chromite, to attain complete hydrogenation. At the higher temperatures in the hydrogenation oven, i. e. about 400°–550° F., the formation of the undesirable reaction products, and in particular the olefins and paraffins corresponding in carbon number to the aldehyde feed, is thoroughly favored. These sulfactive hydrogenation catalysts, however, are exceptionally desirable inasmuch as they not only are not poisoned by sulfur-contaminants in the feed, but also they are unaffected by any carbon monoxide that may come over with the decobalter effluent. In addition, they are exceptionally rugged and have a long life, and are most economical and readily regenerated.

It is one of the purposes and objects of the present invention to provide a means for increasing the alcohol selectivity and yields in the hydrogenation of the effluent crude "aldehyde" product from the catalyst decomposition zone in a carbonylation process.

It is also an object of the present invention to provide a process for hydrogenating the crude product from the aldehyde synthesis stage in the presence of a sulfactive hydrogenation catalyst whereby not only is the formation of secondary reaction products substantially minimized, but also, whereby yields may be obtained at higher temperatures equivalent to those obtained at lower temperatures with sulfur-sensitive catalysts.

It is a still further object of the present invention to set forth a process for hydrogenating aldehydes in the presence of a sulfactive catalyst composition whereby high alcohol yields and long catalyst life are realized.

Other objects and purposes of the present invention will appear more clearly hereinafter.

It has now been found that the addition of a controlled amount of water to the hydrogenation zone in conjunction with the employment of specific sulfactive catalysts results in the recovery of substantially larger quantities of alcohols than has hitherto been found possible with sulfactive catalysts. Thus, it has been found that by addition of water to the decobalted aldehyde product sent to the hydrogenation zone oven in amounts up to about 10% selectivity to the desired alcohols increases by about 6 mol percent and higher for a given hydrogenation temperature level. The water may be added by separate injection into the hydrogenation oven or by injection into the feed to that unit.

The advantage of water in the present process is probably associated with the breakdown of the secondary reaction products formed in the first stage such as, saturated and unsaturated ethers, acetals, etc., and which are present in the feed to the hydrogenation stage. Thus, the reaction by which ethers are broken down in the course of the hydrogenation in the presence of added water to yield alcohols may be illustrated as follows:

(a) 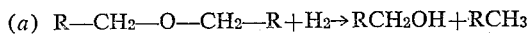

(b) 

Reaction (a) represents hydrogenolysis of the ether linkage. The addition of appreciable amounts of water, however, favors reaction (b), the hydrolysis of the ether linkage. It is thus seen that the net effect of water addition is to increase the yield of alcohol and decrease the yield of hydrocarbon of the same number of carbon atoms as the alcohols.

This relationship between alcohol and hydrocarbon is brought out clearly in Example I below. There it is shown, in column L, that at a hydrogenation temperature of 521° F. in the presence of only 0.4% water, the hydrogenation product resulting from the treatment of a $C_7$ olefin with CO, $H_2$ and a cobalt catalyst contains 9.4% $C_8$ hydrocarbons, 71.9% $C_8$ alcohols, and 18.7% bottoms. However, when 8% water is added, there is only formed 5.2% of the undesired $C_8$ hydrocarbon and 15.6% of the bottoms product, while the desired $C_8$ alcohol yield has been increased to 77.7%, a large increase (column K). It will also be noted that the data show that the higher water partial pressures favor the formation of alcohols according to reaction (b). Not only does the injection of water increase alcohol selectivity but it also permits operation in the hydrogenation zone at higher temperature levels without product decomposition, thereby increasing the activity level at which a sulfactive catalyst may be employed.

Desirable as it is to employ water in the hydrogenation zone in conjunction with a sulfactive catalyst, it has been found that only very specific compositions may be thus employed in this combination. More specifically, it has been found that the employment of water in conjunction with a sulfactive hydrogenation catalyst, such as molybdenum sulfide, creates an additional problem, namely, that of catalyst ruggedness. As a result of the addition of water, the catalyst is subjected to the action of high velocity liquid streams which tend to disintegrate the catalyst and its support, leading to channelling and plugging in the reactor when a structurally weak catalyst is employed. Water has been found to be particularly deleterious to supported sulfactive catalysts.

In accordance with the present invention it has been found that when preformed activated carbon pellets are employed as a support for molybdenum sulfide, tungsten sulfide, nickel sulfide and the like and the sulfactive catalyst thus prepared is employed in conjunction with the water injection technique in the hydrogenation of crude aldehyde product from the carbonylation reaction, there is realized not only a process which may be kept on stream for practically an indefinite period of time because of the exceptionally rugged character of the catalyst in the presence of water but also, there is realized excellent activity and selectivity to alcohol, far superior to other sulfur-insensitive hydrogenation catalysts, or to the same catalyst supported on other supports, or even on the same support prepared in another manner. A preferred way of preparing this catalyst comprises impregnating the preformed pellets with ammonium molybdate solution, drying the impregnated pellets and sulfiding the dry product in a stream of $H_2S$ or with $CS_2$, the latter preferably dissolved in a suitable solvent.

Having set forth its general nature, the invention will best be understood from the following more detailed description in which reference will be made to the accompanying drawing, which represents schematically one embodiment of the invention. Inasmuch as the invention resides in the hydrogenation step and the streams passing thereto, the carbonylation stage and its description, which are well known to those familiar with the Oxo art, have been omitted.

Referring now to the drawing, a liquid mixture comprising primary reaction product from the aldehyde synthesis reaction zone is passed via line 2 from a gas-liquid separator (not shown) to the lower portion of decobalter 4. The crude reaction product contains not only aldehydes but also may contain in varying amounts acetals, esters, saturated and unsaturated ethers, aldols, olefinic and paraffinic hydrocarbons, water, and other secondary reaction products as well as soluble and insoluble compounds and complexes of cobalt, in particular cobalt carbonyl and hydrocarbonyl. In decobalter 4, this complex mixture is thermally treated with water, steam, dilute organic or inorganic acid, or an inert gas such as $H_2$ at 150–500° F. to decompose and remove soluble cobalt from the organic product in a manner known per se.

The liquid carbonylation reaction product now substantially completely free of dissolved and suspended catalyst is withdrawn through line 6 and passed to the lower portion of hydrogenator 10. Simultaneously, hydrogen is supplied to reactor 10 through line 12 in proportions at least sufficient to convert the organic carbonyl compounds in the oxygenated feed into the corresponding alcohols. In accordance with the present invention, highest efficiencies are realized when employing a mass of hydrogenation catalyst comprising molybdenum sulfide supported on preformed activated carbon pellet carrier. Hydrogenator 10 may be operated at pressures of from 2000–4500 p. s. i. g. and at temperatures of from 400° to 600° F. depending upon the nature of the aldehyde product being treated. Reactor 10 is preferably, however, operated at temperatures of about 400° to 550° F., pressures of about 2000–3500 p. s. i. g., preferably 2800–3200 p. s. i. g., a liquid feed rate of about 0.25 to 2 v./v./hr., and an $H_2$ feed rate of from about 5000–20,000 normal cubic feet per barrel of feed.

In accordance with the present invention, water is injected into hydrogenator 10 through line 13 and pump 15. The amount of water added may be as much as 50%, though preferably 1 to 10% of the feed to reactor 10 may be supplied, depending upon temperatures and pressures. It is desirable to add water in such quantities that it is substantially completely in the vapor phase under the conditions prevailing in the hydrogenation zone. Water addition may be continuous or intermittent. The rate of addition is determined to some extent by the rate of decobalter feed addition and may be about 0.0025 to 0.2 v./v./hr. If desired, the injected water may be preheated to the hydrogenation oven temperatures.

The products of the hydrogenation reaction and water are withdrawn overhead through line 14 and after water separation are passed to the alcohol finishing plant for further processing in a manner known per se.

The hydrogenation catalyst is preferably first prepared by impregnating $3/16''$ pellets of activated charcoal with ammonium molybdate, and drying in a steam oven at 250° F. The dried product is transferred to hydrogenator 10, heated to 600–1000° F. in a stream of hydrogen admitted through line 12 at 200–3000 p. s. i. g. and, after reduction of the molybdenum to $MoO_2$ or $MoO$ or a mixture of these oxides, $H_2S$ is passed in to sulfide the catalyst. The preparation of this catalyst, however, is not a part of the instant invention. The catalyst may, however, not be reduced prior to sulfiding. The final material contains 10–20% of $MoS_2$.

The pellets may be prepared by mixing a tar, such as beechwood tar obtained by the destructive distillation of beechwood, with activated carbon to form an extrudable composition, extruding the mixture, pelleting, and thereafter subjecting the pellets to thermal decomposition conditions to remove the tar binder, leaving behind the carbon skeleton of the binder.

The invention may be further illustrated by the following examples which point out clearly the advantages gained when operating in accordance therewith.

Example I

To illustrate the excellent alcohol selectivities obtainable when water is injected into the hydrogenation oven, a $C_8$ aldehyde product derived from a $C_7$ olefin in a semi-commercial carbonylation reactor was treated to prepare a decobalter effluent containing 0.39% water. This relatively anhydrous material was hydrogenated in a ⅛ barrel/day hydrogenation reactor employing a 10% molybdenum sulfide catalyst supported on preformed activated carbon. Small quantities of water were injected directly into the hydrogenation oven by means of a Hills-McCanna pump coupled to a Vickers transmission. Operating conditions were a feed rate (liquid) of 0.6 v./v./hr. and a pressure of 3000 p. s. i. g. hydrogen over a temperature range of 475°–525° F.

[Effect of water on hydrogenation of $C_8$ aldehyde product from decobalter over $MoS_2$-charcoal catalyst at 3,000 p. s. i. g. $H_2$; 0.6 liquid v./v./hr.-1,000 CF./B.]

| Run | E | E | F | H | I | J | J | K | L | L |
|---|---|---|---|---|---|---|---|---|---|---|
| Run Hours | 7–12 | 13–18 | 7–12 | 1–12 | 1–12 | 1–6 | 7–12 | 7–12 | 13–18 | 19–24 |
| Temp., Avg., °F | 479 | 479 | 477 | 502 | 500 | 512 | 524 | 521 | 521 | 521 |
| Total $H_2O$, Wt. Percent on Feed | 0.39 | 0.39 | 4.46 | 7.77 | 4.28 | 4.33 | 4.43 | 8.00 | 0.39 | 0.39 |
| Prod. Inspect.: | | | | | | | | | | |
| Hydroxyl No | 288 | 291 | 293 | 295 | 298 | 295 | 288 | 292 | 275 | 273 |
| Carbonyl No | 1.4 | 1.9 | 2.0 | 1.3 | 0.7 | 0.7 | 0.7 | 0.8 | 0.6 | 0.5 |
| Selectivity to $C_8$ Hydrocarbons, Mol Percent | 3.0 | 3.3 | 2.0 | 2.7 | 4.0 | 4.8 | 7.9 | 5.2 | 9.4 | 9.0 |
| $C_8$ Alcohols | 74.6 | 75.4 | 77.6 | 79.2 | 77.1 | 76.6 | 75.8 | 77.7 | 71.9 | 71.7 |
| Bottoms | 21.2 | 20.8 | 19.7 | 17.3 | 18.1 | 17.6 | 15.4 | 15.6 | 18.7 | 17.9 |

These data indicate the following:

A. The addition of water had no particular effect upon the catalyst activity and the carbonyl number of the alcohol product decreased from a value of 2.0 when hydrogenation was carried out at 477° F., to a value of 0.5–0.6 when reduction was carried out at 521° F. These results of carbonyl reduction were obtained with or without water addition.

B. There was a marked increase in alcohol selectivity. At a water concentration of 4.3–4.5%, an increase in overall selectivity of 3–4 mol percent is realized while the addition of 7.7–8.0% water increases selectivity by about 6 mol percent. With the addition of the larger quantity of water the alcohol selectivity at 520° F. is about 3% higher than at 480° F. without water addition; in addition, there is the distinct advantage of more complete hydrogenation at the higher temperature.

C. With no water addition, the selectivity to $C_8$ hydrocarbons becomes critical at an average temperature of about 520° F. That is, hydrogenation at or above this temperature results in large losses to $C_8$ hydrocarbons. The addition of 4.3–4.5% water, however, decreased the $C_8$ hydrocarbon selectivity by 1.5–2% while a 7.7–8.0% $H_2O$ concentration decreases hydrocarbon selectivity by 3.8–4.2%. Thus by addition of water, hydrogenation temperature with sulfactive catalysts at 520° F. is thus made feasible and the higher activity of the catalyst at these temperatures may now be realized. Catalyst life as well may thus be extended.

D. The selectivity to bottoms is decreased by 1–2% for the addition of 4.3–4.5% water, and by 2–2.5% for the addition of 7.7–8.0% water.

Thus, by injecting water into the hydrogenation zone, increased yields and selectivity to alcohols are realized, accompanied by repressed formation of hydrocarbons and of distillation bottoms.

Example II

A series of experiments were carried out comparing the activity and strength of the preformed impregnated activated carbon supported $MoS_2$ catalyst in the presence of added water with (1) $MoS_2$ catalysts supported on other supports, such as silica gel and alumina and (2) with activated carbon support prepared in another manner, specifically, by impregnating the powdered material and thereafter pelleting. Below are shown the results obtained when molybdenum sulfide catalysts supported respectively on (a) activated preformed carbon pellets, (b) alumina, (c) silica gel and (d) pills formed by impregnating powdered activated carbon with ammonium molybdate and thereafter adding a ball clay binder, drying and pilling were employed in the hydrogenation of $C_8$ Oxo aldehydes in the presence of 6% added water.

The reaction conditions were as follows:

Feed: C₈ Oxo aldehydes (49% total carbonyl)
Temperature: 400° F.
Time: 4 hours
Pressures: 1275-2100 p. s. i. g., electrolytic $H_2$
Water: 6% on feed
Catalyst: 20 wt. percent on feed

| Run | a | | b | | c | | d | |
|---|---|---|---|---|---|---|---|---|
| Base | Charcoal | | Alumina | | Silica Gel | | 40% Carbon. 50% Ball Clay. | |
| Wt. Percent Recovery | 98.2 | | 98.0 | | 98.0 | | 93.8 | |
| Pill Strength: | | | | | | | | |
| Before | 42.5 | | 13.6 | | 4.8 | | 1.4 | |
| After | 35.6 | | 6.6 | | Disintegrated | | Disintegrated | |
| | Wt. Percent | Mol. Percent | Wt. Percent | Mol. Percent | Wt. Percent | Mol. Percent | Wt. Percent | Mol. Percent |
| Distilled Product | 64.4 | 69.3 | 56.4 | 62.8 | 59.7 | 65.2 | 59.8 | 68.2 |
| H₂O | 1.19 | | 1.38 | | 1.03 | | 1.56 | |
| C₇ Hydrocarbon | 6.19 | | 9.09 | | 7.74 | | 11.07 | |
| C₈ Hydrocarbon | 2.11 | | 1.38 | | 1.54 | | 2.17 | |
| Aldehyde | 0.77 | | 3.22 | | 2.06 | | 1.20 | |
| Alcohol | 64.43 | | 56.43 | | 59.69 | | 59.82 | |
| Bottoms | 25.31 | | 28.50 | | 27.94 | | 24.18 | |
| Carbonyl No.: | | | | | | | | |
| Crude Alcohol | 10 | | 32 | | 10 | | 2 | |
| Distilled Alcohol | <1 | | 9 | | 5 | | <1 | |

PILL STRENGTH (IN POUNDS PER SQ. INCH)

| | Before | After | Before | After | Before | After | Before | After |
|---|---|---|---|---|---|---|---|---|
| Catalyst Strength: | | | | | | | | |
| High | 60 | 44 | 18 | 9 | 6 | Disint. | 2 | Disint. |
| Low | 27 | 28 | 10 | 5 | 3 | | 1 | |
| Av | 42.5 | 35.6 | 13.6 | 6.6 | 4.8 | | 1.4 | |

These data show clearly that with the use of the preformed activated carbon catalyst, a 10% increase in alcohol yield is realized, while the catalyst at the end of the run was almost as strong as at the beginning. On the other hand, the catalysts supported on other supports had low initial strength and were weaker, and in some cases disintegrated in the course of the reaction. Thus the low initial pill strength of the alumina and silica gel supported catalysts indicate that they are not suitable for Oxo aldehyde hydrogenation purposes when this hydrogenation is carried out in the presence of added water.

What is claimed is:

1. An improved process for producing alcohols which comprises passing olefinic compounds, carbon monoxide and hydrogen to a carbonylation zone, contacting said olefinic compounds with carbon monoxide and hydrogen and a cobalt carbonylation catalyst in said zone under conditions to form an aldehyde product containing one more carbon atom per molecule than said olefinic compounds as well as secondary reaction products comprising acetals and water, passing a liquid product comprising said aldehydes, acetals, water and dissolved cobalt carbonyl to a catalyst decomposition zone wherein said liquid product is subjected to catalyst decomposition conditions whereby cobalt carbonyl is decomposed into products including carbon monoxide, withdrawing liquid reaction products including aldehydes, acetals, water and carbon monoxide from said catalyst decomposition zone, passing said products to a hydrogenation zone, subjecting the aldehyde-containing products substantially free of cobalt to a hydrogenation reaction in the presence of a sulfactive hydrogenation catalyst supported on preformed activated carbon pellets at pressures of from about 1500 to about 4500 p. s. i. g. and temperatures of from about 400 to about 600° F. adding 1 to 10 weight percent of water based on the aldehyde-containing products fed to said hydrogenation zone, and withdrawing an alcohol product from said last-named zone.

2. An improved process for producing alcohols which comprises passing a C₇ olefin feed, carbon monoxide and hydrogen to a carbonylation zone, contacting said C₇ olefin with carbon monoxide and hydrogen and a cobalt carbonylation catalyst in said zone under conditions to form a C₈ aldehyde as well as secondary reaction products comprising acetals and water, passing a liquid product comprising said aldehyde, dissolved cobalt carbonyl and secondary reaction products including the amount of water formed in the carbonylation zone to a catalyst decomposition zone wherein said products are subjected to catalyst decomposition conditions whereby cobalt carbonyl is decomposed into products including carbon monoxide, withdrawing liquid reaction products including aldehyde, acetals, water and carbon monoxide from said catalyst decomposition zone, passing said products to a hydrogenation zone, subjecting said products to a hydrogenation reaction in the presence of a sulfactive molybdenum sulfide hydrogenation catalyst supported on preformed activated carbon pellets at pressures of from about 2800 to 3200 p. s. i. g. and temperatures of from about 400 to about 600° F., adding about 8 weight percent of water based on the aldehyde-containing products fed to said hydrogenation zone, maintaining said water in the vapor phase in said hydrogenation zone, and withdrawing an alcohol product from said last-named zone.

3. A process according to claim 2 wherein the hydrogenation temperature is above 520° F.

4. The process of claim 3, in which said hydrogenation catalyst is prepared by impregnating preformed charcoal pellets with an ammonium molybdate solution, drying the impregnated pellets and sulfiding the dry product in a stream of hydrogen sulfide.

References Cited in the file of this patent

UNITED STATES PATENTS

| | | |
|---|---|---|
| 2,421,608 | Gohr | June 3, 1947 |
| 2,429,575 | Appleby et al. | Oct. 21, 1947 |
| 2,432,087 | Brown | Dec. 9, 1947 |
| 2,544,271 | Liedholm et al. | Mar. 6, 1951 |
| 2,564,130 | Schreyer | Aug. 14, 1951 |
| 2,610,201 | Rutherford | Sept. 9, 1952 |
| 2,636,903 | Mertzweiller | Apr. 28, 1953 |
| 2,637,746 | Parker | May 5, 1953 |

(Other references on following page)

| | | |
|---|---|---|
| 2,647,149 | Condit et al. | July 28, 1953 |
| 2,760,994 | Gwynn | Aug. 28, 1956 |

FOREIGN PATENTS

| | | |
|---|---|---|
| 147,118 | Great Britain | Nov. 7, 1921 |
| 629,951 | Great Britain | Sept. 30, 1949 |
| 664,974 | Great Britain | Jan. 16, 1952 |

OTHER REFERENCES

Meyer Translation PC–S–V "Oxo Process" (T. O. M. Reel 36, Item 21 and part of Item 36), Mar. 1946, pp. 35, 36, 45 and 46.

Fiat Final Report #1000 (PB 81383), Dec. 26, 1947; pp. 23 and 34.

Wender et al.: Critical Review of Chemistry of Oxo Synthesis for Production of Alcohols . . . ," Bureau of Mines Report of Investigations 4270, June 1948; pp. 8 to 11, 19.